Aug. 13, 1957 J. WEISS 2,802,913
SWITCH CONTROLLING GOVERNOR
Filed June 12, 1956
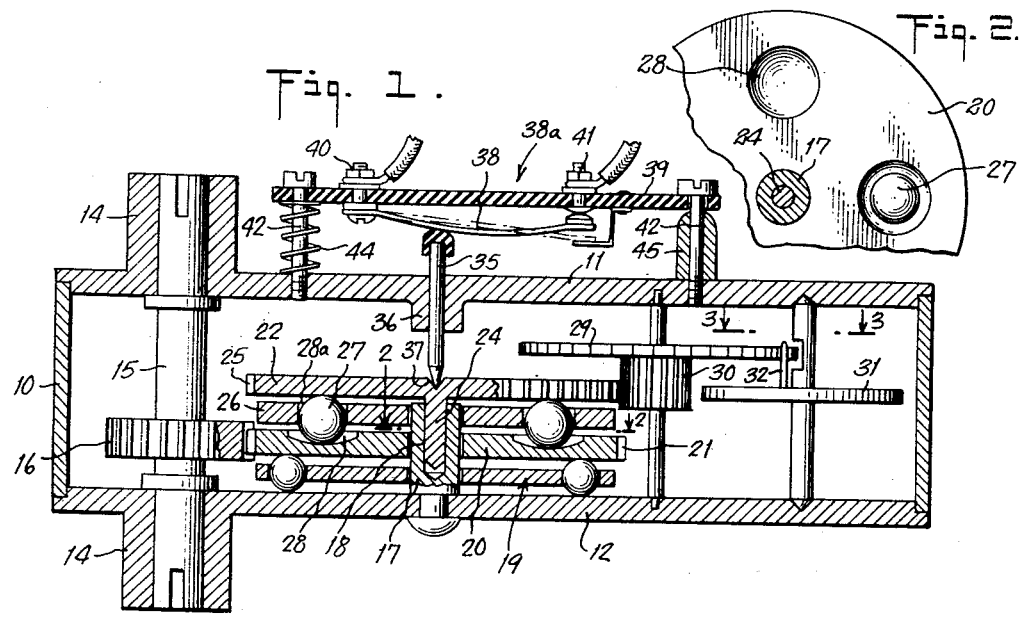
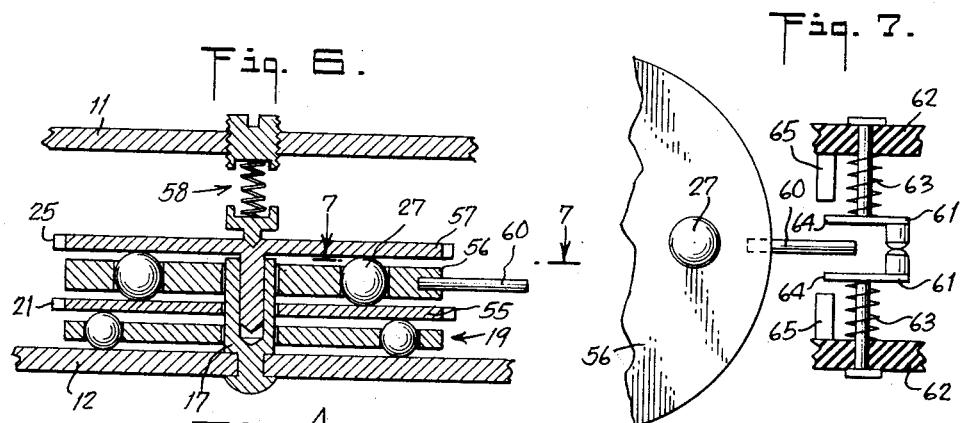
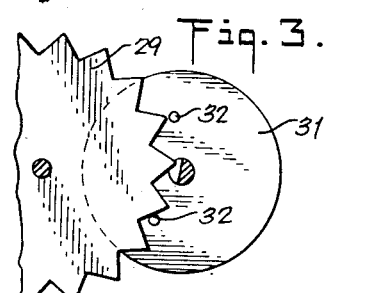
INVENTOR.
JOSEPH WEISS
BY
Leo C. Krazinski
ATTORNEY

United States Patent Office 2,802,913
Patented Aug. 13, 1957

2,802,913

SWITCH CONTROLLING GOVERNOR

Joseph Weiss, New York, N. Y.

Application June 12, 1956, Serial No. 590,889

12 Claims. (Cl. 200—33)

The present invention relates to governors for automatic control of brakes of motor vehicles or the like and, more particularly to such governors which are an improvement over the types shown in United States Patent No. 2,603,731, of which I am a co-patentee.

In the aforementioned patent a brake control system is disclosed, which system essentially comprises front and rear hydraulic brakes connected by conduits to an hydraulic fluid supply container, termed a master cylinder, a foot pedal for effecting operation of the brakes through the master cylinder, a valve for controlling fluid to one of the brakes, a solenoid for controlling the valve, and an electrical circuit for energizing the solenoid including a pair of switches connected in series, one of said switches closing when the accelerator pedal is released and the other of said switches closing through action of a governor after the speed of the vehicle has been reduced below a predetermined value.

One of the purposes of such a brake control system is to prevent skidding of the vehicle which might otherwise occur, if both front and rear brakes were applied and locked by conventional means while the vehicle is moving at a considerable speed. Such skidding is avoided by applicant's governor which opens the solenoid circuit and thereby prevents locking of the brakes upon release of the brake pedal.

A difficulty heretofore encountered has been that the governor could not be easily regulated for reliable operation at most speeds, such as between zero and two miles an hour. As a result, the solenoid circuit remained operative at such low speeds and the brakes likewise remained in a locked condition, thereby producing a drag upon the vehicle.

Accordingly, the primary object of the present invention is to provide an improved governor which overcomes the prior disadvantages by being capable of operating reliably and effectively at extremely low speeds.

Another object is to provide such a governor which comprises a minimum number of moving parts, is compact in arrangement, light in weight but yet sufficiently rugged to have a long useful life, and can be manufactured and assembled in an economical manner.

Another and important object is to provide such a governor which by suitable control means is capable of trapping and storing energy adapted to be released and spent for operating an electrical switch or the like.

A further object is to provide an improved overload and overspeed type of slip drive which is easily adjusted to regulate under what torque loads and speeds the drive will slip.

A still further object is to provide such a governor which is further simplified in that the same is positively driven, for example, by the speedometer cable, without resorting to a magnetic or friction drive heretofore required.

Other and further objects will be obvious upon an understanding of the illustrative embodiment about to be described, or will be indicated in the appended claims, and various advantages not referred to herein will occur to one skilled in the art upon employment of the invention in practice.

In the drawing:

Fig. 1 is a central, sectional view of a governor in accordance with the present invention.

Fig. 2 is a fragmentary sectional view taken along the line 2—2 on Fig. 1.

Fig. 3 is a fragmentary sectional view taken along the line 3—3 on Fig. 1.

Fig. 4 is a plan view of a portion of a modified slip drive.

Fig. 5 is a sectional view taken along the line 5—5 on Fig. 4.

Fig. 6 is a fragmentary sectional view of another form of governor.

Fig. 7 is a fragmentary sectional view taken along the line 7—7 on Fig. 6.

Referring to the drawing in detail and more particularly to Figs. 1, 2 and 3 thereof, a governor is shown which includes a casing or housing comprising a cylindrical side wall 10 and circular top and bottom walls 11 and 12, respectively. The top and bottom walls are each formed with a bearing 14 adjacent the side wall for rotatably mounting a shaft 15 which has a gear 16 secured thereon for rotation therewith.

The shaft 15 is adapted to be driven by a speedometer cable (not shown), such cable consisting of two sections, one of which is driven by a wheel of the vehicle and drives the shaft and the other of which is driven by the shaft and drives the speedometer.

The essential operating elements of the governor generally comprise a rotary member positively driven by the gear 16, a second member in close proximity to the first member and mounted for rotation about the axis of rotation of the first member and for axial movement with respect thereto, slip-clutch or drive means for causing the first member to rotate the second member, means associated with the second member to control the rotative movement of the second member, a switch, an element under control of the second member which is rendered responsive to actuate the switch when the second member is controlled to permit rotative movement thereof, and spring means for returning the switch to its pre-actuated or normal position.

In Figs. 1, 2 and 3, an arrangement of such elements is shown which in part comprises a stud shaft or post 17 secured to and extending upwardly from the bottom wall 12 of the casing and having a central bore 18 at its upper end; a thrust bearing 19, including a disc or cage and ball bearings, rotatably mounted about the shaft 17 and riding on the bottom wall; a cam plate (first member) 20 rotatably mounted on the shaft above the bearing 19 and having peripheral teeth 21 engaged by the teeth of the gear 16 to be positively driven thereby; a disc 22 (second member) having a central depending shaft section 24 disposed in the bore 18 to mount the same for rotative and axial movement and having peripheral teeth 25 for driving an escapement mechanism about to be described; and slip-clutch means including an apertured disc or cage 26 rotatably mounted on the shaft 17 between the cam plate 20 and the disc 22, and ball bearings 27 disposed in the apertures of the disc 26.

In this embodiment the cam plate is formed with circular concave cam recesses 28 each disposed beneath one of the apertures of the disc 26 and in which the ball bearings 27 rest. In their normal position, when the vehicle is at rest or is travelling at a speed of between about zero and two miles per hour, the ball bearings 27 are centrally disposed in the recess. However, at higher speeds of operation the cam plate is driven at a rate to cause the ball bearings to move circumferentially on the floor of the cam recess and to be raised slightly and thereby raise the disc 22 sufficiently to operate a movable element, as described hereinafter. The incline of each of the recesses on which the ball bearings ride is at an angle of about 10° to the horizontal, as shown, and the clearance between the ball bearings 27 and their retaining apertures 23a is on the order of about three thousandths of an inch which allows the ball bearings to pass through the apertures to actuate the disc 22.

The escapement mechanism, as shown herein (Figs. 1 and 3), comprises a star wheel 29 driven by a pinion 30 in mesh with the teeth 25 of the riser disc 22, and a flutter wheel 31 carrying spaced pins 32 engaged by the star wheel. This escapement mechanism resists and retards rotation of the disc 22 in the conventional manner.

The arrangement shown in Figs. 1, 2 and 3 further comprises a pin 35 slidably mounted in a bearing 36 formed on the top wall 11 and engaging the riser disc 22 at the center thereof, the disc 22 being formed with a recess 37 for receiving the point of the pin to reduce frictional resistance; and a blade spring 38 engaging the upper electrically insulated end of the pin 35.

As shown herein, the spring 38 is an element of a switch assembly 38a which comprises a non-conductive base plate 39, a terminal 40 on the base plate having one end of the spring electrically connected thereto, and a terminal 41 on the base plate having a contact normally engaged by free end of the spring when the vehicle is at rest or is moving at a predetermined low speed, as previously indicated. The spring is of the conventional and well known over-center type spring employed in snap type electrical switches. When the riser plate 22 applies a predetermined force on the switch through the pin 35, the switch opens but closes when the force is removed.

In order to adjust said predetermined force the spring 38 normally exerts on the pin 35 without opening of the switch, the base plate is slidably mounted on screws 42 threadedly secured into the top wall 11. A spring 44 coiled about one of the screws urges the base plate away from the top wall, and a stud 45 through which the other screw extends permits the adjustment of the base plate of the switch by the screw 42.

In operation, the torque load on the riser disc 22 is set in relation to the angle of the cam plate recesses and to the resistance afforded by the escapement mechanism, so that the cam plate 20 and the riser disc 22 are rotated in synchronism, for example, at 12 R. P. M. of the shaft 15 when the vehicle is moving at speed of less than one mile per hour. The switch remains closed in this instance. However, should the vehicle be moving at a faster speed, the cam plate 20 tends to rotate faster than the riser disc 22, whereby the ball bearings 27 will be axially displaced by the cam recesses 28 to actuate the switch through the riser disc.

When rotation of the cam plate falls below the speed of rotation for which the riser disc is set, the ball bearings 27 return to the center of the cam recesses to lower the riser plate and permit reclosing of the switch.

During operation of the vehicle at usual driving speeds, the speed of rotation of the cam plate greatly exceeds that of the riser disc, whereby the ball bearings 27 are held against the upper edge of the cam recesses 28 and axial movement of the ball bearings ceases and they are continued to be carried with the cam plate during its rotation. When this occurs, there is a sliding or slipping contact between the surfaces of the ball bearings and the surface of the underside of the riser disc contacted thereby. This slipping limits the amount of torque transferred to the escapement mechanism whereby the high speed of the cam plate is not transferred to the escapement. This prevents excess overspeeding and overloading of the escapement, and permits operation of the governor without damaging effect when the speed of the positive drive is to be much greater than that for which the governor is set.

In order to demonstrate the long useful life of a governor in accordance with the foregoing description, the cam plate, carrying three unlubricated, ⅛ inch, steel ball bearings with a spring force of about seven ounces applied to the riser disc, was continuously rotated at 300 R. P. M. for 400 hours (at 3000 R. P. M. of the shaft 15 for 400 hours), this being equivalent to about 72,000 miles of driving a vehicle. At the end of this test, the governor was opened and inspected and none of the parts showed any measurable wear.

In Figs. 4 and 5, a modified cam plate 50 is shown which is provided with circumferentially extending cam recesses 51 for receiving ball bearings 27. This cam plate enables the cage or disc 26 to be dispensed with, because the cam recesses also act as a guide or retainer for the ball bearings. An upward thrust is exerted on the riser disc when the ball bearings are moved either clockwise or counter-clockwise in response to a predetermined difference in speed between the cam plate and the riser disc.

In Figs. 6 and 7, another arrangement of the essential operating elements of the governor is shown, the positive drive and the escapement mechanism being omitted since the construction and function thereof has already been explained.

In this arrangement certain elements are utilized which correspond to those already described in connection with Figs. 1, 2 and 3 and have corresponding reference numerals applied thereto. The arrangement shown comprises a ball bearing supporting plate 55 (first member) rotatably mounted on the shaft 17 and having teeth 21 engaged by the gear 16 (not shown); an apertured disc 56 (second member) mounted for rotation and axial movement on the shaft 17 and having ball bearings 27 disposed in the apertures thereof, which bearings are supported by the plate 55; a combined slip clutch arrangement and retarding mechanism including a plate 57 rotatably mounted on the shaft 17 and supported by the ball bearings and having teeth 25 for driving the escapement pinion (not shown) and an adjustable spring assembly 58 for applying a force on the plate 57 to control the slip between the plate 55 and the disc 56; an element under the control of the disc 56, such as a non-conductive rod 60 extending radially outwardly therefrom; and a switch assembly actuated by the rod 60.

The switch assembly, as shown in Fig. 7, comprises a pair of contacts 61 each slidably mounted on non-conductive supports 62 and urged towards and into contact with each other by a spring 63. The contacts have spaced apart tips 64 between which the free end of the rod 60 is disposed, whereby the springs 63 serve to restrain the rod and the disc 56 against movement. Suitable stops 65 on the supports 62 limit the extent of movement of the switch contacts 61 and the rod therebetween.

In this arrangement, the ball bearings 27 are held in contact between the plates 55 and 57 by the spring 58, whereby, when the plate 55 is rotated, the ball bearings rotate in the apertures of the disc 56 and transfer the rotary motion of the plate 55 to the plate 57 and cause the plate 57 to drive the escapement mechanism (not shown). When such rotation takes place at a speed the escapement mechanism is capable of permitting, the disc 56 remains at rest under the influence of the springs 63. However, should this speed exceed that permitted by the escapement mechanism, the driving torque of the plate 55 is transferred to the disc 56 and causes the disc 56 to rotate its rod 60 and open the switch. When rotation of the plate ceases or drops to a low speed, the springs 63 act on the contacts to reclose the switch and restore the rod 60 to its neutral position.

During the operation of the governor at driving speeds, the plate 55 rotates at a much greater speed than the escapement mechanism permits the plate 57 to rotate, whereby the switch is held open and plate 55 slips against the ball bearings. It is thus desirable that the spring 58 applies a light force to facilitate such slipping.

From the foregoing description, it will be seen that the present invention provides a governor of the type indicated herein which is accurate and reliable and which functions in response to relatively small changes of forces. This enables the governor to overspeed without damage to moving parts, whereby a positive or direct drive can be employed.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a governor for controlling a switch, the combination of a rotary member, drive means for said member, a second member in close proximity to said first member and mounted for rotation about the axis of said first member and for axial movement with respect thereto, slip-drive means for causing said first member to rotate said second member, means associated with said second member to control the rotation of said second member, a switch, and an element under the control of said second member for operating said switch, said switch including spring means for urging said element towards its normal position.

2. In a governor for controlling a movable element of a device, the combination of a stud shaft having a central bore at the free end thereof, a member mounted for rotation on said stud shaft, positive drive means for said member, a second member having a shaft section mounted in said bore for rotative and axial movement, slip-drive means for causing said first member to rotate said second member, means associated with said second member to control the rotative movement of said second member, resilient means for applying a force to said second member to urge the same towards said first member, and an element rendered responsive when said second member is controlled to permit rotative movement thereof to actuate the movable element.

3. In a governor according to claim 2, and means for adjusting said resilient means.

4. In a governor for controlling a movable element of a device, the combination of a driven rotary member, drive means for said driven member, a second member in close proximity to said first member and mounted for rotation about the axis of rotation of said first member and for axial movement with respect thereto, slip-drive means for causing said first member to rotate said second member, means associated with said second member to control the rotative movement of said second member, resilient means for applying a force to said second member to urge the same towards said first member, means for adjusting the force applied by said resilient means, a switch, and a movable element for operating said switch when said second member is controlled to permit rotation thereof.

5. In a governor according to claim 4, wherein said switch includes a spring element for returning said movable element to its normal position.

6. In a governor for controlling a movable element of a device, the combination of a driven rotary member, drive means for said member, a second member in close proximity to said first member and mounted for rotation about the axis of rotation of said first member and for axial movement with respect thereto, slip-drive means for causing said first member to rotate said second member, means associated with said second member to control the speed of rotation of said second member, resilient means for applying a force to said second member including a spring and a screw for adjusting the force of said spring, and an element rendered responsive when said second member reaches a predetermined speed of rotation.

7. In a governor for controlling a movable element, the combination of a rotatably mounted cam plate having cam recesses therein, a ball bearing in each of said recesses, means for rotating said cam plate, a riser disc mounted for rotation co-axially above said cam plate and being engaged by said ball bearings, means for exerting a force on said riser disc to bear against said ball bearings, means for limiting the rotation of said riser disc to a predetermined speed, and means responsive to said riser disc when the latter reaches said predetermined speed to actuate said movable element, said ball bearings being capable of slip when the speed of the cam disc is greater than that of the riser disc.

8. A governor for controlling a movable element comprising a driven rotary member, a second member mounted for rotation about the axis of said first member, ball bearings on said first member for rotating said second member, means coupled to said second member for limiting the speed of said second member to a predetermined rotation, said ball bearings being adapted to introduce slippage between said members when the speed of the second member is so limited, and means responsive to said second member when the latter reaches said predetermined rotation to actuate said movable element.

9. A governor in accordance with claim 8, wherein said movable element is an electric switch.

10. A governor in accordance with claim 8, wherein said limiting means include an escapement.

11. A governor in accordance with claim 8, in which said second member is axially displaceable.

12. A governor for controlling a movable element of a device comprising a driven member, a second member capable of receiving motion from said driven member, ball bearings on said first member for rotating said second member, said ball bearings being capable of slip, means including an escapement associated with said second member and adapted to limit said motion, and means effected by said limited motion to actuate said movable element.

References Cited in the file of this patent

UNITED STATES PATENTS

| Number | Name | Date |
|---|---|---|
| 2,140,620 | Farmer | Dec. 20, 1938 |
| 2,160,191 | Fitch | May 30, 1939 |
| 2,603,731 | Weiss et al. | July 15, 1952 |
| 2,638,518 | Randol | May 12, 1953 |
| 2,639,135 | Sloan | May 19, 1953 |
| 2,656,175 | Lee | Oct. 20, 1953 |